United States Patent Office 2,934,509
Patented Apr. 26, 1960

2,934,509

METHYL METHACRYLATE POLYMER COATING COMPOSITION

Laverne W. Crissey, Penfield, and John H. Lowell, Brookline, Pa., assignors to E. I. du Pont de Nemours and Company, Wilmington, Del., a corporation of Delaware No Drawing. Application June 4, 1954
Serial No. 434,661

8 Claims. (Cl. 260—30.6)

This invention relates to liquid coating compositions containing polymers of methyl methacrylate and particularly to liquid coating compositions containing polymers of methyl methacrylate having specific viscosity characteristics.

By the term "polymer of methyl methacrylate" and related terms, as used herein, are meant homopolymers of methyl methacrylate, copolymers of methyl methacrylate and other materials copolymerizable therewith containing at least about 95% by weight of polymerized methyl methacrylate, or mixtures of such homopolymers and/or copolymers.

Coating compositions containing a polymer of methyl methacrylate as the principal film-forming constituent have long been known, but these have not resulted in satisfactory finishes because they had too high viscosity or were too low in polymer content to produce thick films, or they were deficient in essential film properties.

We have found that it is possible to make coating compositions which are free of these objections and which have an especially desirable balance of properties with respect to viscosity, polymer content and film properties, by using a particular type of methyl methacrylate polymer which has previously not been used for such a purpose.

Accordingly, it is a broad object of this invention to provide new methyl methacrylate polymer coating compositions rather than to provide improvements in known methyl methacrylate polymer coating compositions.

It is a specific object of this invention to provide coating compositions containing polymers of methyl methacrylate, which polymers have not previously been employed for any practical purpose and, in particular, not as film-forming materials in coating compositions.

These objects are accomplished by employing a particular type of methyl methacrylate polymer, i. e., one having a relative viscosity between 1.117 and 1.196, inclusive, as measured by the method described in detail hereinafter.

More specifically, these objects are accomplished by providing liquid coating compositions comprising a polymer of methyl methacrylate having a relative viscosity of 1.117–1.196 and solvent therefor, with or without plasticizer and/or pigment.

The polymers of methyl methacrylate having relative viscosities between 1.117 and 1.196 which are employed in this invention may be selected directly from the products of bulk, granular, emulsion or solution polymerization of methyl methacrylate, with or without up to 5% by weight of other materials copolymerized therewith; i. e., these direct polymerization products are not further processed in any manner which materially affects polymer viscosity. Alternatively, higher viscosity methyl methacrylate polymers, comprising a plurality of fractions having different relative viscosities, one of which fractions has a relative viscosity between 1.117 and 1.196, may be treated by preferential solvency techniques to extract a fraction having the desired viscosity.

This invention is not intended to include coating compositions made from higher viscosity methyl methacrylate polymers which are reduced in viscosity by strenuous milling, as on a rubber mill under conditions of high shear; such compositions being separately disclosed and claimed in copending application Serial No. 192,152, which was filed October 25, 1950, by Laverne W. Crissey and John H. Lowell.

Methyl methacrylate polymer coating compositions in which the polymer has a relative viscosity below about 1.117 are deficient in essential film properties. In particular they tend to be more brittle and to crack more readily, when the coated surface is dented by impact or is bent along a relatively long axis, than the polymers of higher relative viscosity. Such deficiencies prevent their commercial acceptance for use on thin deformable metal, such as is used in automobile bodies.

Methyl methacrylate polymer coating compositions in which the polymer has a relative viscosity above about 1.196 are too high in viscosity to be applied conveniently, or too low in polymer content, at an applicable viscosity, to produce reasonably thick films. Thus they possess the deficiencies of the methyl methacrylate polymer coating compositions disclosed in the prior art, and consequently are not intended to form a part of this invention.

One specific method of preparing suitable polymers of methyl methacrylate is by introducing suitable proportions of distilled methyl methacrylate monomer, catalyst and solvent into a closed reaction vessel equipped with a thermometer, agitator and reflux condenser, heating the contents with continuous agitation for about 2 to 9 hours, and then cooling to room temperature.

By using this method under a variety of conditions, as indicated in the following table, methyl methacrylate polymers having the relative viscosities required in this invention are obtained. All ingredients are shown by weight.

TABLE 1.—METHYL METHACRYLATE POLYMERS

| Relative Viscosity | Molecular Weight | Methyl Methacrylate | Solvent | | Catalyst | Temp., °C. | Percent Conversion to Polymer | Reaction Time, Hours |
|---|---|---|---|---|---|---|---|---|
| | | | Toluene | Acetone | | | | |
| 1.112 | 52,000 | 40 | 42 | 18 | 0.6 azo [1] | 130 | 72 | 9 |
| 1.117 | 55,000 | 40 | 42 | 18 | 0.362 benzoyl peroxide | 90 | 93 | 9 |
| 1.142 | 70,000 | 40 | 42 | 18 | 0.28 azo [1] | 130 | 65 | 9 |
| 1.147 | 73,000 | 50 | 8 | 42 | 0.3025 benzoyl peroxide | 92 | 99 | 6 |
| 1.154 | | 40 | 60 | | 0.306 benzoyl peroxide | 85 | 94 | 6 |
| 1.165 | 85,000 | 50 | 35 | 15 | 0.2813 benzoyl peroxide | 92 | 99 | 6 |
| 1.170 | 88,000 | 50 | 8 | 42 | 0.27 benzoyl peroxide | 89 | 96 | 6 |
| 1.173 | 90,000 | 45 | 38.5 | 16.5 | 0.2417 benzoyl peroxide | 89 | 98 | 8 |
| 1.173 | 90,000 | 66.67 | 23.33 | 10.0 | 0.4 benzoyl peroxide | 100 | 98 | 2 |
| 1.192 | 102,000 | 62 | 26.6 | 11.4 | 0.341 benzoyl peroxide | 90 | 95 | 3 |
| 1.207 | 112,000 | 66.67 | 23.33 | 10.0 | 0.333 benzoyl peroxide | 100 | 96 | 2 |

[1] Azo catalyst=alpha alpha' azodiisobutyronitrile.

Further variations will be obvious to those skilled in the art, such as substituting methyl methacrylate monomer stabilized with an inhibitor like hydroquinone for the distilled monomer disclosed, or substituting a different catalyst for those disclosed, or substituting for up to 5% of the total polymerizable material a monomer which copolymerizes with methyl methacrylate.

Other polymers of methyl methacrylate may be made in a similar manner.

The relative viscosity values, as employed in the description of this invention and in the appended claims, are the values of the fraction $$\frac{(A) \text{ Efflux time of polymer solution}}{(B) \text{ Efflux time of solvent used in polymer solution}}$$

The efflux times are measured in accordance with the procedure of ASTM–D–445–46T Method B using, as the "oil" mentioned in said procedure, (A) a solution of 0.25 gram of the methyl methacrylate polymer being tested in 50 cc. of ethylene dichloride, and (B) a sample of the ethylene dichloride used in making said solution, respectively. The determinations are run at 25° C. in a modified Ostwald viscosimeter, series 50.

By this method the methyl methacrylate polymers employed in this invention have relative viscosity values between 1.117 and 1.196, which correspond to calculated molecular weight values of 55,000 and 105,000, respectively.

Molecular weight values, referred to herein, are on the basis of weight average molecular weight, and are calculated from the equation $$M = 1.47 \times 10^6 (N_r - 1 - \ln N_r)^{0.65}$$

in which M is the molecular weight and $N_r$ is the value of the fraction $$\left(\frac{A}{B}\right)$$

discussed above.

With the above and other objects in view, which will be apparent as the description proceeds, we have set forth our invention in the following specification, and have included several specific examples by way of illustration, but not by way of limitation. Unless otherwise indicated, the parts and percentages are by weight.

Examples

A series of coating compositions of this invention were prepared by grinding pigment, methyl methacrylate polymer, plasticizer and solvent in conventional paint grinding apparatus until smooth dispersions were produced. The proportions and other variables are recorded in the following table:

was accelerated by heating for 30 minutes at 200° F. The resulting coatings were between 1 and 2 mils thick and were glossy, smooth and hard. The coatings were also found to be adherent when scraped with a sharp knife, and flexible when bent through a 90° angle or dented with a spherical impact tester.

Example 10

The following is a formula for a coating composition of this invention which contains a copolymer of methyl methacrylate:

| | Parts by weight |
|---|---|
| Methyl methacrylate polymer (relative viscosity 1.167) | 9.4 |
| Methyl methacrylate copolymer (relative viscosity 1.144) | 2.0 |
| Benzyl butyl phthalate plasticizer | 4.6 |
| Titanium dioxide pigment | 4.0 |
| Toluene | 52.0 |
| Xylene | 4.0 |
| Acetone | 24.0 |
| | 100.0 |

The methyl methacrylate copolymer contained 98% polymerized methyl methacrylate and 2% polymerized methacrylic acid.

A coating of this composition was similar in appearance and physical properties to the products of Examples 1–9.

Although methyl methacrylate homopolymers, which are a preferred embodiment of the invention, were employed in Examples 1–9 for purposes of direct comparison, and a 98% polymerized methyl methacrylate/2% polymerized methacrylic acid copolymer was employed in Example 10, other copolymers of methyl methacrylate and other materials copolymerizable therewith, containing at least about 95% by weight of polymerized methyl methacrylate, may be substituted for all or part of the homopolymers used in the above examples, or in other coating compositions within the scope of the appended claims, provided the relative viscosity of said copolymer is between 1.117 and 1.196.

Examples of suitable monomers which can be copolymerized with methyl methacrylate to provide copolymers for use in this invention include acrylic and methacrylic acids, short chain (i.e. 1–4 carbon atom) alkyl esters of acrylic acid, 2–4 carbon atom alkyl esters of methacrylic acid, vinyl acetate, acrylonitrile, and styrene. A particularly preferred copolymer is that employed in Example 10, which contains about 98% methyl methacrylate and 2% methacrylic acid. Mixtures of polymers of methyl methacrylate may also be employed in this invention.

TABLE 2

| Example No. | 1 | 2 | 3 | 4 | 5 | 6 | 7 | 8 | 9 |
|---|---|---|---|---|---|---|---|---|---|
| Methyl Methacrylate Polymer—Relative viscosity | 1.131 | 1.133 | 1.154 | 1.163 | 1.183 | 1.193 | 1.193 | 1.193 | 1.193 |
| Parts by weight: | | | | | | | | | |
| Methyl methacrylate polymer | 15.5 | 17.5 | 15.0 | 14.3 | 12.8 | 12.3 | 13.1 | 12.3 | 13.6 |
| Dibutyl phthalate plasticizer | 6.2 | 7.0 | 6.0 | 5.7 | 5.1 | 4.9 | 5.2 | 4.9 | 5.4 |
| Toluene | 37.3 | 35.7 | 37.7 | 38.3 | 79.0 | 39.9 | 39.9 | 39.3 | 39.7 |
| Xylene | 37.3 | 35.6 | 37.7 | 38.3 | | 40.0 | 40.0 | 39.2 | 39.8 |
| Titanium dioxide pigment | 3.7 | 4.2 | 3.6 | 3.4 | 3.1 | 2.9 | | | |
| Phthalocyanine green pigment | | | | | | | 1.8 | | |
| Milori blue pigment | | | | | | | | 4.3 | |
| Carbon black pigment | | | | | | | | | 1.5 |
| | 100.0 | 100.0 | 100.0 | 100.0 | 100.0 | 100.0 | 100.0 | 100.0 | 100.0 |

The methyl methacrylate polymer in each example was a homopolymer. Those used in Examples 1, 4, 5, 6, 7, 8 and 9 were prepared in the form of granules by emulsion polymerization in water, and those used in Examples 2 and 3 were prepared by solution polymerization in toluene.

The resulting coating compositions were applied by conventional methods to steel panels which had been previously primed with a baked coating of a conventional metal primer. The drying of the newly-applied coatings The preferred polymers have relative viscosities between 1.148 and 1.183.

Although toluene and xylene were employed as the solvents in the above examples for purposes of illustration, the invention is not limited thereto. Other solvents for the polymers of methyl methacrylate employed in this invention may be substituted for all or part of the solvents used in the examples. Other suitable solvents include ketones such as acetone, esters such as ethyl acetate, ether alcohols such as ethylene glycol monoethyl ether, and aromatic hydrocarbons such as benzene. Nonsolvents, such as alcohols and aliphatic hydrocarbons, may be employed provided sufficient solvent is present to dissolve the polymer.

The relative amounts of polymer and solvent which may be used is not critical, and is limited entirely by the practical considerations of suitable application viscosity and suitable thickness of the coating. Dilute solutions of low viscosity polymers are one extreme and produce only very thin coatings under practical conditions. Conversely, concentrated solutions of high viscosity polymers are difficult to apply in the form of uniform coatings. The most useful concentrations are 10%–50% by weight of polymer based on the total weight of polymer and solvent. In the lower portion of this range, the preferred polymers are of relatively high viscosity, and in the upper portion of this range the preferred polymers are of relatively low viscosity, thus providing easily applied compositions which yield relatively thick coatings.

Many well-known plasticizers for polymers of methyl methacrylate may be employed in the compositions of this invention to replace all or part of the dibutyl phthalate or benzyl butyl phthalate used in the examples. However, the particular plasticizer used affects the physical properties of the resulting coating, including, for example, cracking, crazing, flexiblity and durability. The other preferred plasticizers which will produce films having especially desirable properties, are triphenyl phosphate, 2-ethyl hexyl benzyl phthalate and dicyclohexyl phthalate. Other well-known plasticizers for polymers of methyl methacrylate which may be employed include diallyl phthalate, dibenzyl phthalate, butyl cyclohexyl phthalate, mixed benzoic acid and fatty oil acid esters of pentaerythritol, poly (propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethyl hexyl ester of hexamethylene diphthalate, and di-(methyl-cyclohexyl) phthalate. Plasticizers are normally employed in amounts of about 10–50% by weight based on the weight of the polymer of methyl methacrylate.

In place of or in addition to the pigments disclosed in the examples, a wide variety of other pigments commonly used in organic coating compositions may be used. Examples of such other pigments include other iron blues, such as Prussian blue or Chinese blue, phthalocyanine blues; metal oxides, hydroxides, sulfides, sulfates, silicates and chromates; organic maroons, aluminum flake, bronze powders, pearl essence, and various fillers or extenders such as talc, barytes, china clay and diatomaceous earth. Mixtures of such pigments may also be used.

It will be obvious to those skilled in the organic coating art that the amount of pigment used is not critical, except that it must be high enough to provide the necessary hiding power. The amount of pigment, by weight based on the weight of the organic film-forming material, may vary between about 2% for light, high-hiding pigments, such as carbon black or aluminum, and about 100% for heavy, low-hiding pigments such as lead chromate.

Pigments may be omitted from the compositions of this invention to provide clear coating compositions.

The method of dispersing or grinding pigment in the film-forming materials is not critical provided a smooth, uniform dispersion of finely divided pigment is produced. Examples of suitable equipment well-known in the art are ball, pebble, buhrstone, roller, and colloid mills, and kneader-mixers, such as Banbury or Werner-Pfleiderer. The pigment may be ground with all of the other ingredients or only part of them. In the latter case the balance will be admixed after the grinding is completed.

While the preferred coating compositions of this invention contain, as film-forming materials, only polymers of methyl methacrylate and plasticizers therefor, suitable compositions may be prepared by incorporating other compatible film-forming materials with the aforementioned ingredients in proportions up to about 10% by weight based on the total weight of the film-forming constituents of the composition. Examples of such additive film-forming materials are cellulose nitrate, other cellulose esters, alkyd resins, and polymers of the short chain alkyl esters of acrylic and methacrylic acids other than polymethyl methacrylate. Obviously it is most convenient to incorporate the additive materials in the form of solutions.

While the examples show baking as a step in the preparation of coatings from the products of this invention, the baking step is not essential. Baking is mainly a means of shortening the drying period to a minimum. If desired, the coatings may be air dried under normal conditions of atmospheric temperature and humidity with good ventilation. Air drying to a stage which permits handling usually requires 4–24 hours. Baking at 150°–200° F. normally reduces the drying time to 30–60 minutes, whereas baking at 250–300° F. reduces the time to 15–20 minutes.

The coating compositions of this invention are useful for applying decorative and protective coatings to articles manufactured from a variety of materials, such as wood, metal, ceramics and other organic and inorganic substances. In many cases, such as in coating metal, it may be desirable first to coat the substrate with a suitable priming composition. An important advantage of the resulting coatings is their excellent outdoor durability, as evidenced by retention of their original gloss and resistance to disintegration of the film during prolonged exposure to the elements.

It is apparent that many widely different embodiments of this invention may be made without departing from the spirit and scope thereof; and, therefore, it is not intended to be limited except in accordance with the appended claims.

We claim:

1. A coating composition comprising a polymer of methyl methacrylate having a relative viscosity between 1.117 and 1.196 inclusive and a solvent therefor, said polymer of methyl methacrylate being a member of the group consisting of homopolymers of methyl methacrylate, copolymers of methyl methacrylate and another material copolymerizable therewith containing at least about 95% by weight of polymerized methyl methacrylate, said other material being a member of the group consisting of acrylic acid, methacrylic acid, 1–4 carbon atom alkyl esters of acrylic acid, 2–4 carbon atom alkyl esters of methacrylic acid, vinyl acetate, acrylonitrile and styrene, said polymer being present in the amount of 10% to 50% by weight based on the total of said polymer and solvent.

2. The product of claim 1, in which the polymer of methyl methacrylate is a homopolymer.

3. The composition of claim 1 in which the polymer of methyl methacrylate is a copolymer of methyl methacrylate and acrylic acid, said copolymer containing at least about 95% by weight of polymerized methyl methacrylate.

4. The composition of claim 1 in which the polymer of methyl methacrylate is a copolymer of methyl methacrylate and methacrylic acid, said copolymer containing at least about 95% by weight of polymerized methyl methacrylate.

5. The composition of claim 1 in which the polymer of methyl methacrylate is a copolymer of methyl methacrylate and 1–4 carbon atom alkyl esters of acrylic acid, said copolymer containing at least about 95% by weight of polymerized methyl methacrylate.

6. The composition of claim 1 in which the polymer of methyl methacrylate is a copolymer of methyl methacrylate and 2–4 carbon atom alkyl esters of methacrylic acid, said copolymer containing at least about 95% by weight of polymerized methyl methacrylate.

7. The composition of claim 1 containing a plasticizer of the group consisting of dibutyl phthalate, benzyl butyl phthalate, triphenyl phosphate, 2-ethyl hexyl benzyl phthalate, and dicyclohexyl phthalate.

8. The composition of claim 1 containing a pigment.

References Cited in the file of this patent

UNITED STATES PATENTS

| | | |
|---|---|---|
| 2,046,886 | Strain | July 7, 1936 |
| 2,063,078 | Barrett | Dec. 8, 1936 |
| 2,204,517 | Strain | June 11, 1940 |
| 2,362,397 | Pearce | Nov. 7, 1944 |
| 2,384,070 | Bolton | Sept. 4, 1945 |